Dec. 30, 1941.  J. A. BOWEN  2,267,715
POSITION INDICATING SYSTEM
Filed March 23, 1939  5 Sheets-Sheet 1

Inventor
John A. Bowen.
By Lacey & Lacey, Attorneys

Dec. 30, 1941.   J. A. BOWEN   2,267,715
POSITION INDICATING SYSTEM
Filed March 23, 1939   5 Sheets-Sheet 2

Inventor
John A. Bowen.
By Lacy & Lacy, Attorneys

Dec. 30, 1941.  J. A. BOWEN  2,267,715
POSITION INDICATING SYSTEM
Filed March 23, 1939  5 Sheets-Sheet 3

Inventor
John A. Bowen.
By Lacey & Lacey, Attorneys

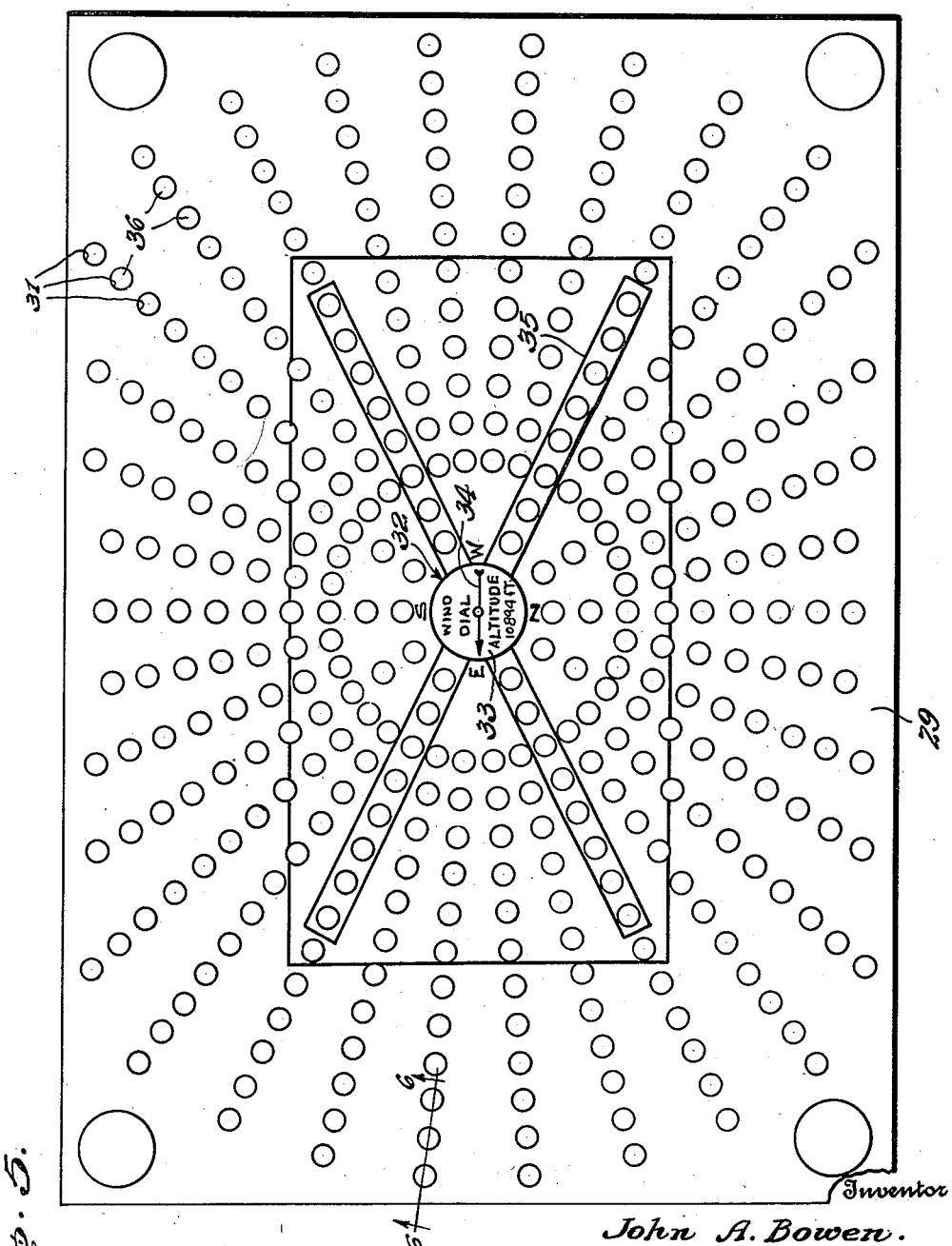

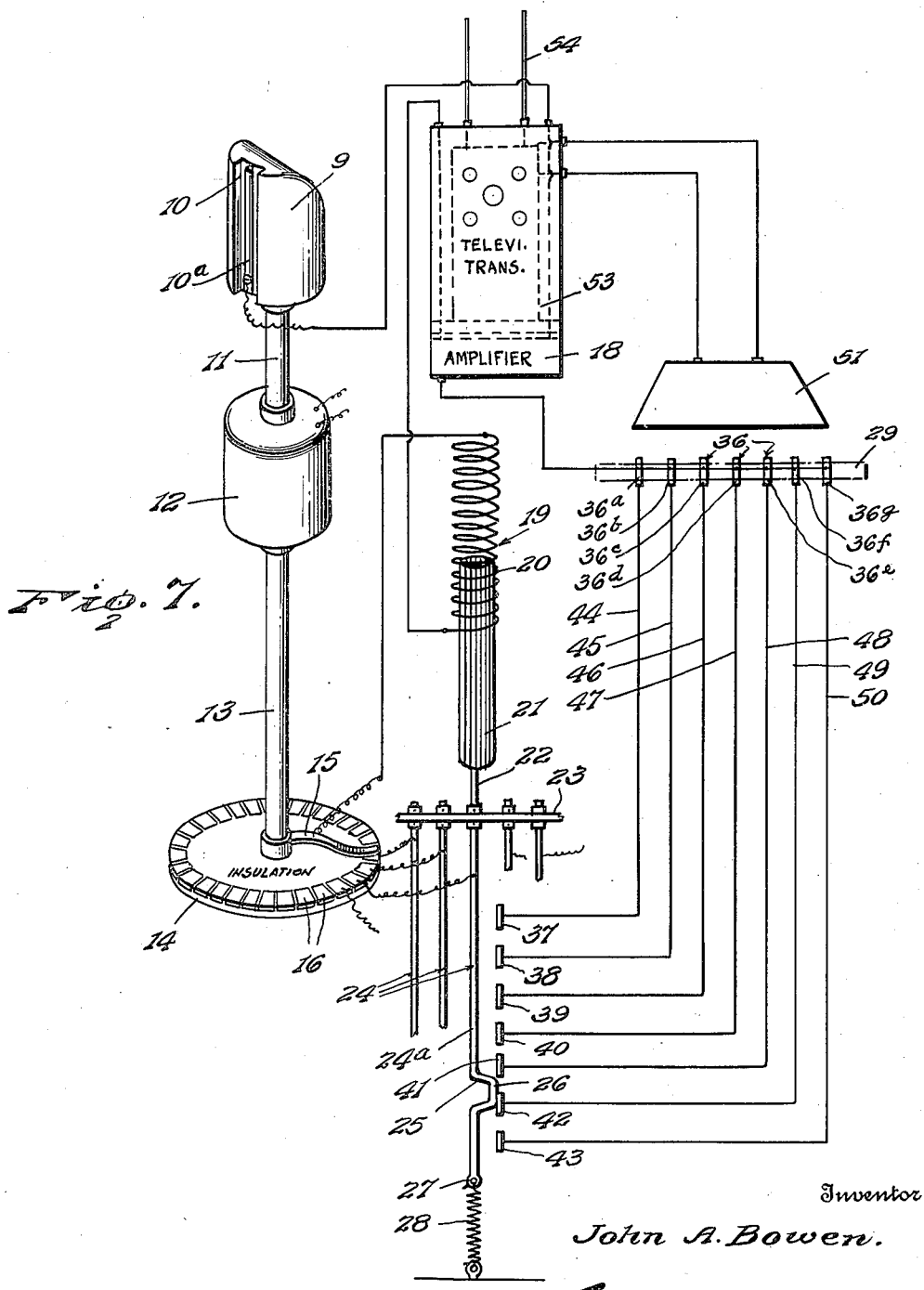

Patented Dec. 30, 1941

2,267,715

UNITED STATES PATENT OFFICE 2,267,715

POSITION INDICATING SYSTEM

John A. Bowen, Pueblo, Colo.

Application March 23, 1939, Serial No. 263,793

7 Claims. (Cl. 250—11)

This invention relates to an improved blind flying and altitude indicating system, and seeks among other objects, to provide a system of this character, the use of which will enable an airplane pilot to ascertain his position with respect to an airport on which he desires to land or a hazard to be avoided, with the result that he will be able to effect a safe landing at the airport, or to avoid the hazard, regardless of visibility conditions.

Another object of the invention is to provide a blind flying and altitude indicating system wherein apparatus is employed which will give accurate indication, up to a predetermined height, of the distance of the plane above the landing field, regardless of the condition of the terrain, so that the pilot will be enabled, with the knowledge previously gained from the use of the blind flying apparatus, to make a proper landing.

A further object of the invention is to provide a blind flying and altitude indicating system which will make use of television equipment, neon display equipment and radio transmitting and receiving apparatus for providing the pilot with clear indication of his position when near an airport or a hazard.

A further object of the invention is to provide a system of this character employing an improved receiving antenna.

And as a still further object, the invention seeks to provide a blind flying and altitude indicating system, the actual indicating devices of which will be positioned for convenient scrutiny by the pilot.

Other and incidental objects of the invention not mentioned hereinbefore will become apparent as the description proceeds.

My invention is illustrated in the accompanying drawings, wherein

Figure 1:
Figure 2:
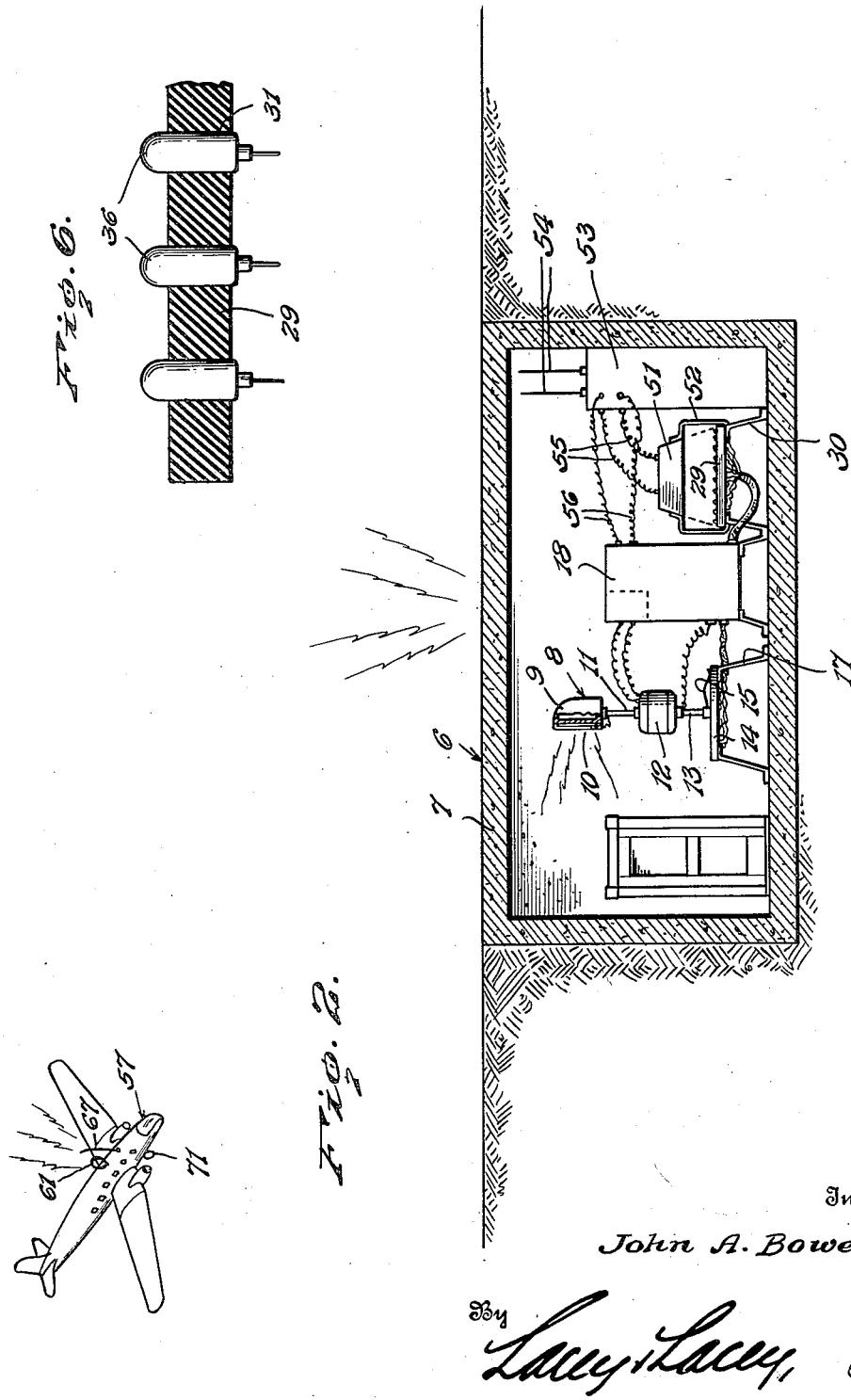
Figure 3:
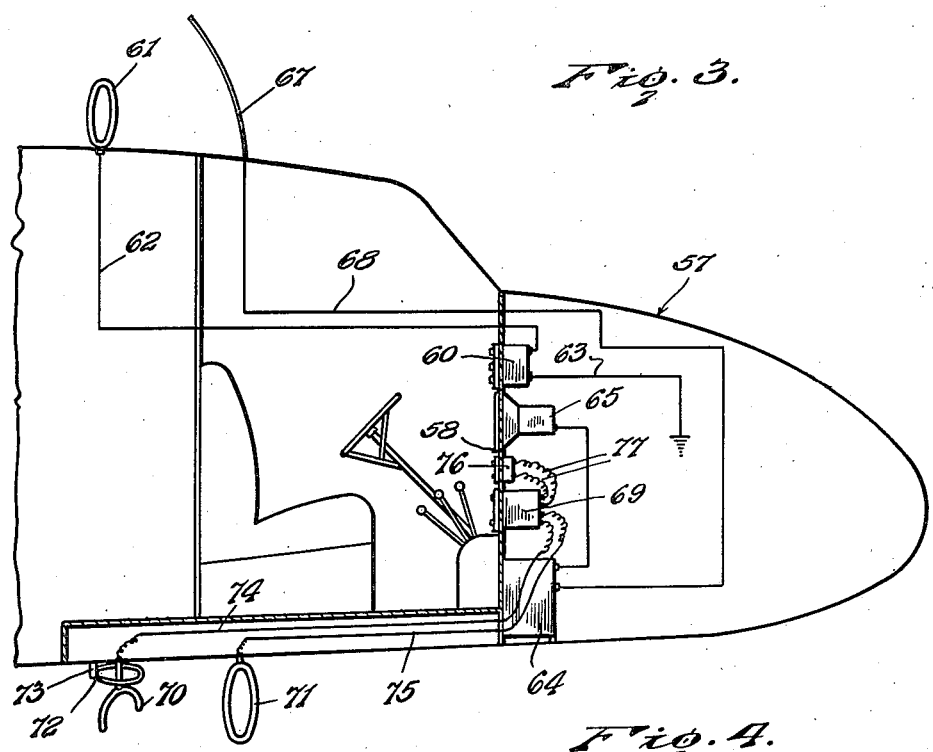
Figure 4:
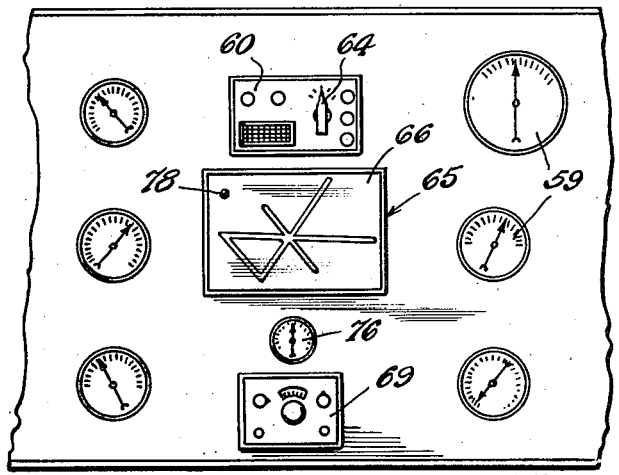

Figure 1 is a perspective view showing an airplane about to land on an airport equipped with my improved system, Figure 2 is an enlarged detail side elevation showing the cellar at the airport in which is mounted a receiving, selecting, and television transmitting equipment, Figure 3 is a sectional view showing the cockpit of an airplane and showing diagrammatically the indicating instruments mounted therein, Figure 4 is a detail front elevation of a portion of the airplane instrument board, and showing the indicating devices employed with my system mounted thereon, Figure 5 is an enlarged top plan view of the minute replica or fac-simile of the airport which is to be scanned by the televisor, Figure 6 is a fragmentary longitudinal sectional view on the line 6—6 of Figure 5, and Figure 7 is a diagrammatic view showing the receiving and selecting apparatus, in conjunction with the amplifier and televisor employed.

Referring now to the drawings in more detail, the numeral 1 indicates in general an airport which may be of any desired arrangement, that shown being conventional and including a plurality of runways which intersect at 2.

At the point of intersection of the runways, which I shall indicate at 3, 4 and 5 for sake of convenience, I provide a cellar 6 which, as shown in Figure 2, is substantially rectangular in formation. The walls and ceiling defining the cellar 6 are to be preferably of non-metallic material. The roof 7 of the cellar has its upper surface lying flush with the surface of the runway so that no obstruction to an airplane rolling on the runway will be effected. In the cellar 6, there is mounted a receiving antenna, shown generally at 8. The receiving antenna has a substantially circular shaped frame 9 in which is formed a slot 10, in which is mounted an antenna element 10$^a$. It is desired to point out that the frame 9 is grounded for the purpose of providing perfect shielding for the antenna element 10$^a$ against all signals, except those which come in the same vertical plane with the openings of the antenna which is, of course, located at the front of said frame. The frame 9 is mounted on a stem 11 which is carried by a synchronous motor 12, the motor 12 being adapted to rotate the frame and antenna at a speed of thirty-six hundred revolutions per minute. The motor 12 has a shaft 13 which depends and is movably mounted in a disk 14. Carried on the shaft 13 is an arm 15. The disk 14, as best seen in Figure 7, is made up of a plurality of segments 16 which are selectively engageable by the arm 15 as the motor rotates said arm. Legs 17 conveniently support the disk 14 above the floor of the cellar 6.

The disk 14, with the rotating arm 15 thereon, forms a part of selector mechanism 18 which is also mounted in the cellar. The selector mechanism 18 is shown in more detail in Figure 7 of the drawings and includes a solenoid 19 having a coil 20 and a core 21. The core 21 of the solenoid 19 has attached thereto a stem 22 to which is fixed a cross member 23. The cross member 23 carries a plurality of armatures 24 to each of which is connected one of the segments 16 of the disk 14. It should be understood that an armature 24 is provided for each of the segments 16 although but one of the armatures is shown in complete detail, as at 24$^a$. The armature 24$^a$ has a bowed portion 25 which defines a contact 26. At its lower end, the armature 24$^a$ is formed with an eye 27 to which is attached a retractile spring 28.

In Figures 2 and 5 of the drawings, there is shown a screen 29 which is preferably formed of suitable composition and is rectangular in shape. It has been found that a thickness of one-half inch approximately is satisfactory for the purpose. On the screen 29 is placed a plaster of Paris replica in miniature reproduction of the actual airport, air base or hazard at which the apparatus is located. The screen 29 is suitably supported by means of legs 30, in a horizontal position. It should be understood that, if desired, the screen may be supported in any suitable location within the cellar. Formed in the screen 29 are rows of openings 31 which are arranged radially from an axis 32 at which axis is located a wind dial and a ceiling indicator 33. A wind vane 34 is also provided at the axis 32. Runways 35 are, of course, provided on the replica of the airport and these runways are arranged on the replica in a manner to correspond with the actual arrangement of the runways at the airport. As best seen in Figure 6, each of the openings 31 has mounted therein a neon tube 36. The neon tubes are so arranged that their upper ends will project through the upper surface of the screen for a purpose which will be made clear hereinafter. Each of the tubes 36, or each of the rows of tubes is connected to a separate contact engageable by the contact 26 on the armature 24. That is to say, in Figure 7, neon tubes 36ª, 36ᵇ, 36ᶜ, 36ᵈ, 36ᵉ, 36ᶠ and 36ᵍ are connected, respectively, to contacts 37, 38, 39, 40, 41, 42 and 43 by conductors 44, 45, 46, 47, 48, 49 and 50. It should be understood that each of the tubes of each of the rows of tubes are connected in the same manner as described with regard to the neon tubes 36ª through 36ᵍ and the contacts 37 through 43. That is to say, each of the armatures 24 will be connected with one of the segments 16 and will also have contact 26 engageable with the contacts corresponding to the contacts 37 through 43.

The televisor 51 is also mounted in the cellar and is supported by feet 52 above the screen 29. As the televisor will be of conventional design, which design may be varied to suit specific conditions, it is not deemed necessary to describe its structure in detail. Suffice it to say that the scanning equipment will be of a size and construction capable of fully scanning the screen 29. The televisor is connected with a transmitting unit which is shown in general at 53. The transmitting unit is mounted in the cellar 6 and has an antenna 54 connected therewith. Conductors 55 connect the televisor 51 with the amplifier 53, while conductors 56 connect the selector mechanism 18 with the amplifier. It should be understood that the amplifier contains several units. That is to say, the televisor 51 will be connected to one of the units in the amplifier for transmitting television signals from the antenna 54. In addition, the amplifier 53 will include a voltage amplifying unit which will magnify the signal received from the antenna 10 and an appropriate receiver connected therewith so that proper voltage will be supplied to the coil 20 of the solenoid 19.

Referring now to Figures 3 and 4 of the drawings, there is shown a cockpit of an airplane of the transport type. It should be understood that my improved system may be employed in connection with aircraft of any type whatever. The airplane is indicated in general by the numeral 57 and will be seen to include an instrument panel 58 of a conventional design. On the instrument panel are mounted a group of the usual meters 59.

An oscillator unit is shown at 60. This oscillator unit is capable of transmitting a five hundred cycle per second audio frequency signal on a wave length of approximately two and one-half meters. The oscillator is capable of radiating a modulated signal over a maximum one hundred mile radius. For effecting radiation, an antenna 61, of the ring or sphere type, is employed and is connected to said oscillator by means of a conductor 62. The oscillator is also connected with a ground terminal 63. As seen in Figure 3, the above-mentioned oscillator is mounted on the instrument board 58 in a position convenient for manipulation by the pilot. Although it is deemed unnecessary to describe the construction of the oscillator, it is desired to state that said oscillator is capable of variation in power output, a switch 64 being employed for effecting the variation. Also mounted within the cockpit of the plane forwardly of the instrument panel 58 is a television receiver unit 64. The receiver unit has connected therewith a cathode ray tube 65 having a screen 66. The screen 66 will be of such size that it will be capable of providing a picture of a size approximately eighteen by twenty-four inches on the instrument panel. The television receiver unit is connected with an antenna 67 by a conductor 68. The antenna 67 may be of any suitable type, a vertical one being shown. The television receiver unit is, like the transmitter unit located in the celler 6, of a conventional design and need not be described herein. The design may be varied to suit particular operating conditions and progress in the art.

Mounted on the instrument board 58 below the cathode ray tube 65 is an altitude indicator transmitter-receiver unit 69. The transmitter-receiver unit 69 employs two antennae 70 and 71. The antenna 70 has a reflector 72 disposed therebehind which reflector would be insulated from the antenna 70 and from the body of the airplane by a suitable insulator 73. The antenna 70 is for transmitting purposes and is connected to the output transmitter section of the unit 69 by a conductor 74. The antenna 71 is for receiving purposes and is connected with the output of the receiver section of the unit 69 by a conductor 75. A zero to one-half milliammeter 76 is mounted on the dash and is electrically connected with the receiving section of the unit 69 by conductors 77.

The operation of the entire system will now be described. It is now assumed that the airplane 57 is approaching an airport and that conditions are such that the pilot is unable to see the ground at the airport. The pilot will switch on the oscillator unit 60, when the five hundred cycle audio frequency wave will be broadcast from the antenna 61. It will first be assumed that the plane is within a hundred miles of the airport. The transmitted signal will be received by the antenna 10 which is rotating within the frame 9 at a rate of thirty-six hundred revolutions per minute. The incoming signal is received from the antenna 10 and amplified by the unit 18. The voltage amplification of the unit 18 is caused to operate the solenoid 19 so that the coil 20 will be energized. The coil 20 is electrically connected to the arm 15 of the disk 14, said arm 15 being in synchronism with the antenna 10. The amplifying signal extends from the commutator segments 16 to each of the armatures 24 which are operated by the stem 22 and the core 21. It should be borne in mind that, as heretofore stated, there are as many segments 16 as there are armatures 24. Also that there are as many segments as there are rows of radius lines or neon tubes 36. The signal strength of the broadcast signal from the oscillator unit in the plane will be such that the core 21 will be caused to lift for engaging the contact 26 on the armature 24ᵃ with the outermost of the contacts which connects with the neon tubes, i. e., the contact 43. The result will be that the neon tube 36ᵍ with which contact 43 is connected will be illuminated. The televisor unit 51 will scan the screen 29, with illuminated neon tube 36ᵍ thereon, and this picture will be transmitted from the amplifier 53 and received by the televisor receiver unit 64 in the airplane. The received picture signal will be displayed on the screen 66 of the cathode ray tube 65. The position of the plane with respect to the airport will be shown by the neon tube 36ᵍ which, in the plane, will be indicated by a white dot 78.

As the plane moves nearer the airport, the signal strength will naturally increase with the result that the amplifier voltage in the coil 20 will increase and the core 21 will be raised. As the core 21 with the armature 24ᵃ is raised, contact is successively made between the contact 26 with the contacts 42, 41, 40, 39, 38 and 37. As these contacts are made, the neon tubes 36ᶠ, 36ᵉ, 36ᵈ, 36ᶜ, 36ᵇ and 36ᵃ are lighted. On the screen 66 on the instrument board 58 of the plane, the successive lighting of these tubes will have the effect of moving the dot 78 nearer the center of the screen, which, of course, represents the center of the airport. When the neon tube 36ᵃ has been lighted, it will be apparent that the signal strength has reached a maximum and that, in order for the device to operate accurately, it will be necessary to cut down the signal strength. The pilot, therefore, turns the switch 64 to a second position for reducing the output of the oscillator. This operation could probably take place when the airplane was within fifty miles of the airport. The result of the reduction of power from the oscillator will be that with the signal strength at the antenna 10 will be materially reduced. The coil 20 of the solenoid 19 will be de-energized to such a degree that the core 21 will be allowed to drop until the contact 26 of the armature 24 engages the outermost of the contacts connected with the neon tubes. That is to say, the contact 43. The signal strength will increase as the plane nears the airport, with the result that the neon tubes 36ᵍ through 36ᵃ will be successively illuminated, as heretofore explained. When the plane reaches a position about five thousand feet above the airport, the pilot will again cut down the output of the oscillator unit 60. This will, of course, change the position of the white dot 78 and as the pilot nears the ground, the white dot 78 will be caused to move toward the center of the screen 66 in the same manner as heretofore described.

It will be seen that the pilot will thus be enabled to land his ship on an airport irrespective of weather conditions prevailing at the port. Also, by virtue of the fact that I employ the dial 32, with ceiling indication and weather vane thereon, he will be able to ascertain weather and wind conditions prevailing at the port. Attention is directed to the fact that as I employ the disk or commutator 14, the segments thereon, which commutator is in synchronism with the antenna 10, the neon tube on the radius lines pointing in the direction from which the plane is approaching will be illuminated. Attention is further directed to the fact that as I employ a lead frame for the antenna 10, all signal strength, except that coming in the same vertical plane with an opening through the antenna, will be rejected.

It is desired to point out that, while I have described a device as being used in conjunction with an airport or base, it should be understood that the cellar 6 may be placed at a point along a high range of mountains or at some other hazard so that the pilot may ascertain when he is approaching the hazard with a view to avoiding it.

The operation of the altitude indicator transmitter-receiver unit will now be described.

It is a well-known fact that altitude meters in use up to the present are inaccurate to close measurements due to the inaccuracy of ground calculation or terrain topography from one point or another. In order to effect accurate measurement of the altitude of the plane to afford proper landing thereof, I employ the unit 69, hereinabove mentioned. The unit includes a transmitter, i. e., a small oscillator which transmits a signal on a fractional meter wave length from antenna 70. Due to the fact that ultra-short waves are employed, the signal radiation is highly directional. The frequency is so high in fact that it borders on the light spectrum and requires a very short antenna, that is, the antenna 70. The reflector 73 directs the beam from the antenna 70 toward the ground and this beam is reflected by the ground and picked up by the antenna 71. The antenna 71, of course, feeds the receiver section of the unit 69 and operates the receiver. The milliammeter 76 will be, as stated, connected to the output of the receiver section and will have its scale calibrated in feet instead of in units. That is to say, the maximum indication on the meter will be preferably three hundred feet. The strength of the reflecting signal would, of course, be greater at ten feet above the ground than at three hundred feet above. The variation in strength of the reflecting signal, of course, effects variations in the input of the receiver section of the unit 69 and consequent variation in the output section, which variation is shown by the milliammeter 76. It will now be understood that the pilot will, with this altitude indicator-transmitter receiver unit and the position-indicating apparatus, be able to guide his ship to an airport and to set it down thereon without accident irrespective of weather conditions.

It is believed that the operation of my improved blind flying and altitude indicating system will be understood without further explanation.

Having thus described the invention, what is claimed as new is:

1. In a system of the class described, a mobile unit, an oscillator in the mobile unit, a television receiver in said unit, and means disposed at a point remote from the mobile unit and being operable by a signal from the oscillator for effecting the transmission of a televised signal for reception on the television receiver in the mobile unit, said television signal representing a picture of the remote point toward which the mobile unit is moving whereby knowledge of conditions existing at the remote point may be known, said means including an amplifier for amplifying the signal from the oscillator, a screen representing the remote point, selectively energizable direction and distance indicating means on the screen, means operable by the amplified signal for energizing said direction and distance indicating means for indicating on the screen the location of the mobile unit, and a television transmitter for transmitting the image of the screen.

2. In a system of the class described, an airplane, an oscillator in the airplane, a television receiver in the airplane, a directive antenna mounted at a fixed area remote from the position of the airplane, an amplifier connected with said antenna, a replica in miniature of the area, neon tubes carried by the replica and connected with the amplifier, said neon tubes being arranged in rows extending radially from the center of the screen, means including said antenna and responsive to an incoming signal from the airplane for selectively energizing certain of said neon tubes on the replica in accordance with maximum signal strength and direction of the incoming signal, a televisor mounted for scanning the replica, and a transmitter connected with the televisor and being operable for transmitting the image of the replica, said image to be received at the television receiver whereby a pilot in the airplane may by noting the position of the illuminated neon tube on the image, ascertain his position with respect to the remote area.

3. In a system of the class described, an airport having intersecting runways, a cellar positioned in the ground at the intersection of the runways, a disk in the cellar, means supporting the disk on the surface of the floor of the cellar, said disk having a commutator provided with segments, a motor having a shaft with one end journaled through the disk, an arm carried by the shaft and being engageable with the segments, said motor having the other end of the shaft extended and provided with a frame, an antenna mounted in the frame, said frame and arm being adapted to be rotated in synchronism by the motor, a selector unit in the cellar and including a solenoid having a coil and a core, an armature provided with a contact, a plurality of contacts selectively engageable by the armature, means connecting certain of the segments of the commutator with the armature, a screen mounted within the cellar exteriorly of the selector mechanism and having rows of openings, neon tubes in the openings, a miniature replica of the airport mounted on the screen, means electrically connecting the last-mentioned contacts with the neon tubes, an amplifier having an amplifying unit connected with the solenoid and the neon tubes, a televisor mounted to scan the screen and miniature replica, and a transmitter unit carried by the amplifier and connected with the televisor, said antenna being operable for feeding a signal from a remote point to the amplifier and the solenoid and commutator to the armature, said solenoid being thus energized for shifting the armature and selectively engaging the contacts whereby the neon tubes will be selectively illuminated, said televisor and transmitter unit of the amplifier being operable for transmitting a picture of the miniature replica with certain illuminated neon tubes to the remote point for reception at said remote point.

4. In a system of the class described, a chamber located at a fixed area, a screen mounted in the chamber, a replica of the area mounted on the screen, a plurality of neon tubes carried on the screen and visible on the replica, means for receiving and amplifying a signal for a mobile unit, selecting means connected with said last-mentioned means and said screen, said selecting means including means operable by the amplified signal for effecting energization of a neon tube disposed near the outer limits of the screen in the direction of the mobile unit, a televisor for scanning the screen, and means for transmitting the televised image of the screen to the mobile unit approaching the fixed area whereby an operator in the mobile unit may ascertain his position with respect to the fixed area, the increase in strength of the signal upon approach of the mobile unit effecting illumination of neon tubes progressively toward the center of the screen so that the operator may ascertain that he is nearing the fixed area.

5. A system of the class described as recited in claim 1, wherein said direction and distance indicating means comprises a plurality of neon tubes arranged in rows on the screen radiating from the center thereof.

6. In a system of the class described, an oscillator in an airplane, a television receiver in the airplane, an air port including a chamber, an antenna in the chamber, a disk in the chamber and having a commutator provided with segments, an arm on the disk and engageable with the segments, means for rotating the arm and antenna in synchronism, a selector unit in the chamber and having a solenoid, an amplifier unit in the chamber, said solenoid having a core and a plurality of armatures, means connecting each of the armatures with each of the segments, a plurality of contacts selectively engageable by each of the armatures, a screen in the chamber, neon tubes on the screen, means connecting each of the neon tubes with one of the contacts, a miniature replica of the airport on the screen, a televisor mounted for scanning the replica, and means for transmitting the television image to the airplane, said oscillator transmitting a wave to the antenna and said amplifier and selector units effecting selective energization of the neon tubes in accordance with the strength of the oscillator signal, said televisor scanning the replica and said last-mentioned means transmitting the televised picture to the television receiver whereby a pilot may ascertain his position with respect to an airport.

7. In a system of the class described, an antenna, a disk having a commutator provided with segments, an arm carried by the antenna on the disk and selectively engageable with the segments, means for rotating the arm and antenna in synchronism, a selector unit having a solenoid having a coil, a core and a plurality of armatures, an amplifier connected with the antenna and to the solenoid, means connecting each of the armatures with each of the segments, a plurality of contacts selectively engageable by each of the armatures, a screen in the chamber, a plurality of neon tubes on the screen, and means connecting each of the neon tubes with one of the contacts, said neon tubes being arranged in rows and being selectively energizable for indicating the distance and direction of a unit remote from the chamber.

JOHN A. BOWEN.